United States Patent
Campbell et al.

(10) Patent No.: US 6,965,494 B2
(45) Date of Patent: Nov. 15, 2005

(54) MAGNETIC RECORDING HEAD HAVING A FIRST POLE FOR GENERATING AN EASY AXIS FIELD AND AN AUXILIARY POLE FOR GENERATING A FIRST AUXILIARY HARD AXIS FIELD THAT OPPOSES AN INITIAL HARD AXIS FIELD

(76) Inventors: Robert Owen Campbell, 420 Ponderosa Dr., Boulder, CO (US) 80303; Chitra Seshan, 420 Ponderosa Dr., Boulder, CO (US) 80303

( * ) Notice: Subject to any disclaimer, the term of this patent is extended or adjusted under 35 U.S.C. 154(b) by 130 days.

(21) Appl. No.: 10/436,545

(22) Filed: May 12, 2003

(65) Prior Publication Data

US 2003/0210494 A1 Nov. 13, 2003

Related U.S. Application Data

(60) Provisional application No. 60/379,852, filed on May 13, 2002.

(51) Int. Cl.$^7$ .............................................. G11B 5/147
(52) U.S. Cl. ...................................................... 360/126
(58) Field of Search .......................... 360/115, 125–127

(56) References Cited

U.S. PATENT DOCUMENTS

| | | | |
|---|---|---|---|
| 4,317,148 A | | 2/1982 | Chi |
| 4,656,546 A | | 4/1987 | Mallory |
| RE33,949 E | | 6/1992 | Mallary et al. |
| 5,402,292 A | * | 3/1995 | Komoda et al. ........ 360/327.31 |
| 5,590,008 A | | 12/1996 | Tanabe et al. |
| 6,717,770 B1 | * | 4/2004 | Crawford .................... 360/125 |
| 2002/0131203 A1 | | 9/2002 | Litvinov et al. |
| 2003/0076629 A1 | | 4/2003 | Minor |

FOREIGN PATENT DOCUMENTS

| | | |
|---|---|---|
| DE | 3544883 A1 | 6/1987 |
| EP | 0 301 823 A2 | 2/1989 |
| EP | 0 472 031 A2 | 2/1992 |
| WO | WO 98/29868 | 7/1998 |
| WO | WO 03/010758 A1 | 2/2003 |
| WO | WO 03/036625 A1 | 5/2003 |

OTHER PUBLICATIONS

IEEE Transactions on Magnetics, vol. 1, Jan. 2003, p. 613.

Mallary et al., "One Terabit per Square Inch Perpendicular Recording Conceptual Design" IEEE Transaction on Magnetics, vol. 38, No. 4, Jul. 2002, pp. 1719–1724.

Miles et al., "Vector Recording in Perpendicular Media" IEEE Transactions on Magnetics, vol. 38, No. 5, Sep. 2002, pp. 2060–2062.

(Continued)

*Primary Examiner*—A. J. Heinz

(57) ABSTRACT

A magnetic recording head includes a first pole having multiple magnetic layers separated by multiple gap layers. The multiple magnetic layers make up a write pole which produces a first hard axis field and a first auxiliary pole that produces a first auxiliary field that opposes the first hard axis field resulting in a reduced net hard axis field. The write pole and the first auxiliary pole are separated by a first gap layer made of a material that is less magnetically conducting than the write pole and the first auxiliary pole. The write pole is located upstream from the first auxiliary pole relative to a perpendicular magnetic recording medium. A portion of the first auxiliary pole exists in a region between a surface of the perpendicular magnetic recording medium and five microns from a surface of the perpendicular magnetic recording medium.

46 Claims, 14 Drawing Sheets

OTHER PUBLICATIONS

Yoshihisa Nakamura, "Perpendicular magnetic recording—progress and prospects", (1999), Journal of Magnetism and Magnetic Materials 200, 634–648.

International Search Report—PCT/US03/15019.

Thompson, D., "The Role of Perpendicular Recording in the Future of hard Disk Storage," *J. Mag Soc Japan*, v. 21(S2):9–15 (1997).

Iwasaki, S., "Perpendicular Magnetic Recording—Evolution and Future," *IEEE Trans. On Magnetics*, 20(5):657–662 (1984).

Yamakawa, K. et al., "High Writability Head with Robustness Against Stray Field and Narrow–Track Recording Properties," *IEEE Trans. On Magnetics*, 38(4):1652–1657 (2002).

Miles, J. et al., "Vector Recording Properties of Perpendicular Media," *IEEE Trans. On Magnetics*, 38(5):2060–2062 (2002).

Benkali, M. et al., "Micromagnetic Study of Switching Speed in Perpendicular Recording Media," *IEEE Trans. On Magnetics*, 37(4):1564–1566 (2001).

Wu, Lianjun et al., "Low Noise Co/Pd Multilayer Media for Pendicular Magnetic Recording," *IEEE Trans. On Magnetics*, 35(5):2775–2777 (1995).

Eppler et al., "Perpendicular Recording Near 100Gb/in$^2$," *IEEE Trans. On Magnetics*, 39(2):663–667 (2003).

Zhu, J. et al., "Modeling of Lamination Effects for ThinFilm Inductive Heads," *IEEE Trans. On Magnetics*, 32(5):3533–3535 (1996).

Slonczewski, J. C., "Micromagnetics of Closed–Edge Lamination," *IEEE Trans. On Magnetics*, 26(5):1322–1327 (1990).

Schare, J. et al., "Design Considerations for Single–Pole Type Write Heads," *Magnetics Conference, INTERMAG Europe 2002, Digest of Technical Papers (IEEE Int'l.)*, p. FB1 (2002).

Ise, K. et al., "Cusp Field Single Pole Head with High Recording Resolution," *Magnetics Conference, INTERMAG Europe 2002, Digest of Technical Papers (IEEE Int'l.)* p. FB3 (2002).

Mallary, M., "One Terabit per Square Inch Perpendicular Recording Conceptual Design," *IEEE Trans. On Magnetics*, 38(4):1719–1724 (2002).

Xia, W. et al., "High Field Gradient Single Pole Head with a Novel Pole Structure," *IEEE Trans. On Magnetics*, 38(5):p. 2216 (2002).

Victora, R., "Area Density Limits for Pendicular Magnetic Recording," *IEEE Trans. On Magnetics*, 38(5):1886–1891 (2002).

\* cited by examiner

MAGNETIC RECORDING HEAD HAVING A FIRST POLE FOR GENERATING AN EASY AXIS FIELD AND AN AUXILIARY POLE FOR GENERATING A FIRST AUXILIARY HARD AXIS FIELD THAT OPPOSES AN INITIAL HARD AXIS FIELD

CROSS-REFERENCE TO RELATED APPLICATION

This application claims priority to U.S. Provisional Application No. 60/379,852, which was filed on May 13, 2002. The contents of U.S. Provisional Application No. 60/379,852 are hereby incorporated by reference into this application as if set forth herein in full.

FIELD OF THE INVENTION

This invention relates to a magnetic recording head and, more particularly, to a magnetic recording head containing a write head that controls vector fields during writing on a perpendicular recording medium.

BACKGROUND

A magnetic recording head generally includes two portions: a writer portion for storing encoded information on a magnetic recording medium, such as a disk or tape, and a reader portion for retrieving recorded information from the medium. In the case of perpendicular recording, the writer portion typically includes a single writing pole and one or more return poles. The standard configuration has a single return pole situated upstream of the write pole.

The poles are made of magnetic material and are separated from each other at the recording surface by a nonmagnetic, or poorly magnetic, gap layer. Current flowing through conductive coils is generally used to create magnetic flux that is carried through the writing pole. This creates a magnetic field at the magnetic medium, setting its magnetization and encoding information for later retrieval by the reader. The flux returns to the writer through one or more return poles.

Diagrams showing the configuration of a magnetic recording write head in a disk drive and a tape drive are shown, respectively, in FIGS. 1a and 1b. The axes labeled X, Y, Z depict the relative directions of downstream, across-track, and above-head surface.

The magnetic field emanating from the write head into the medium is distributed at various angles relative to the medium surface. The medium easy axis (or anisotropy) direction is the direction of lower energy and therefore preferred direction of magnetization. The easy axis is designed to be uniform and typically in the direction perpendicular to the medium surface for perpendicular recording (or vertical recording).

Directions perpendicular to the easy axis are typically considered the hard axis direction. The write field at the medium produced by the write head is in the easy axis direction for some portions of the write field and may contain hard axis components in other portions of the write field. Hard axis fields during writing are an issue in perpendicular recording.

SUMMARY

In general, in one aspect, the invention is directed to a magnetic recording head that includes a first pole which generates an easy axis field and an initial hard axis field relative to a recording medium, and a first auxiliary pole which generates a first auxiliary hard axis field that opposes the initial hard axis field. This aspect may include one or more of the following features.

A gap may be present between the first pole and the first auxiliary pole. The gap may be made of a less magnetically conducting material than the first pole and the first auxiliary pole. The magnetic recording head may include a second pole having an associated hard axis field relative to the recording medium, and a second auxiliary pole which generates a second auxiliary hard axis field that opposes the associated hard axis field. The first pole and the first auxiliary pole may comprise a write pole, and the second pole and the second auxiliary pole may comprise a return pole. There may be a gap between the second pole and the second auxiliary pole. The gap may comprise a less magnetically conducting material than the second pole and the second auxiliary pole.

The magnetic recording head may include a second auxiliary pole which generates a second auxiliary hard axis field that opposes a magnetic field from the first auxiliary pole. The first pole, the first auxiliary pole, and the second auxiliary pole may comprise a write pole. A first gap may separate the first pole and the first auxiliary pole. The first gap may comprise a less magnetically conducting material than the first pole and the first auxiliary pole. The magnetic recording head may include a second gap which separates the first auxiliary pole and the second auxiliary pole, the second gap comprising a less magnetically conducting material than the first auxiliary pole and the second auxiliary pole.

A portion of the first auxiliary pole may exist in a region between a surface of the recording medium and a predetermined distance, such as five microns or less, from the surface of the recording medium. The first auxiliary pole may be a predetermined distance adjacent to the first pole. The predetermined distance may be less than four times a distance between a write surface of the magnetic recording head and a center of the recording medium.

The first auxiliary pole may be located in a downstream direction relative to the first pole. The first auxiliary pole may be located in one or more track edge directions relative to the first pole. The initial hard axis field may be greater in magnitude than the first auxiliary hard axis field. The first auxiliary hard axis field may combine with the initial hard axis field to reduce a net hard axis field at a point on the medium.

The magnetic recording head may include N (N>1) auxiliary poles which generate N auxiliary hard axis fields. The first pole, the first auxiliary pole, and the N auxiliary poles may make up a write pole. There may be gaps between layers of the N auxiliary poles. The first auxiliary pole may have a gradient of properties in a down-track or a cross-track direction.

In general, in another aspect, the invention is directed to a magnetic recording system that includes a magnetic recording medium and a magnetic recording head. The magnetic recording head may include a first pole which generates an easy axis field and an initial hard axis field relative to a recording medium, and a first auxiliary pole which generates a first auxiliary hard axis field that opposes the initial hard axis field. This aspect may include one or more of the following features.

The magnetic recording medium may comprise one of a magnetic disk and a magnetic tape. The easy axis field may be perpendicular to a surface of the magnetic recording medium. The magnetic recording system may include a gap between the first pole and the first auxiliary pole. The gap may be a less magnetically conducting material than the first pole and the first auxiliary pole.

The magnetic recording system may include N (N≧1) auxiliary poles which generate N auxiliary hard axis fields. The first pole, the first auxiliary pole, and the N auxiliary poles may make up a write pole. The first auxiliary pole and at least one of the N auxiliary poles may be at different distances from the recording medium. The first pole, the first auxiliary pole and the N auxiliary poles may be separated by gaps. The gaps may be made from a less magnetically conducting material than one or more of the first pole, the first auxiliary pole, and the N auxiliary poles. The first pole, the first auxiliary pole and the N auxiliary poles may be separated by gaps. One of the materials that make up the gap may be air.

The first pole may be a write pole. The magnetic recording system may also include one or more return poles. At least one of the return poles may include a second pole having an associated hard axis field relative to the recording medium, and a second auxiliary pole which generates a second auxiliary hard axis field that opposes the associated hard axis field.

In general, in another aspect, the invention is directed to a magnetic recording head. The magnetic recording head includes multiple magnetic layers. A first of the multiple magnetic layers produces an initial magnetic field and others of the multiple magnetic layers produce progressively smaller magnetic fields. The magnetic fields produced by the multiple magnetic layers act to reduce a net hard axis magnetic field at a portion of a magnetic recording medium. This aspect may include one or more of the following features.

The magnetic recording head may include multiple gap layers which separate the multiple magnetic layers. The multiple gap layers may be made of a material having less magnetic conductivity than at least one of the multiple magnetic layers. The magnetic recording head may include a second set of multiple magnetic layers. A first of the second set of multiple magnetic layers may produce an initial magnetic field and others of the multiple magnetic layers may produce progressively smaller magnetic fields. The magnetic fields produced by the second set of multiple magnetic layers may act to reduce a net hard axis magnetic field at a portion of a magnetic recording medium.

The second set of multiple magnetic layers may make up a return pole. The first of the multiple magnetic layers may be located upstream relative to others of the multiple magnetic layers and/or adjacent to a track edge relative to others of the multiple magnetic layers.

In general, in another aspect, the invention is directed to a magnetic recording head, which includes means for producing an easy axis field and a hard axis field relative to a magnetic recording medium, and means for reducing the hard axis field. This aspect may include one or more of the following features.

The means for producing an easy axis field and a hard axis field may comprise a write pole. The means for reducing the hard axis fields may comprise at least one auxiliary pole. The auxiliary pole may produce a magnetic field that acts to reduce the hard axis field. The magnetic field produced by the auxiliary pole may be substantially opposite in polarity to the hard axis field. The magnetic field produced by the auxiliary pole may substantially cancel the hard axis field at a point on the recording medium. The magnetic recording head may also include means for magnetically isolating the means for producing from the means for reducing. The means for magnetically isolating may be at least one gap layer.

In general, in another aspect, the invention is directed to a magnetic recording head which includes a first pole having multiple magnetic layers separated by multiple gap layers. The multiple magnetic layers include a write pole which produces a first hard axis field and a first auxiliary pole that produces a first auxiliary field that opposes the first hard axis field resulting in a reduced net hard axis field. The write pole and the first auxiliary pole are separated by a first gap layer comprised of a material that is less magnetically conducting than the write pole and the first auxiliary pole. The write pole is located upstream from the first auxiliary pole relative to a perpendicular magnetic recording medium. A portion of the first auxiliary pole exists in a region between a surface of the perpendicular magnetic recording medium and five microns from a surface of the perpendicular magnetic recording medium. This aspect of the invention may include one or more of the following features.

The magnetic recording head may include a second pole having multiple magnetic layers separated by multiple gap layers. The multiple magnetic layers may include a first return pole which produces a second hard axis field and a second auxiliary pole that produces a second auxiliary field that opposes the second hard axis field resulting in a reduced net hard axis field. The first return pole and the second auxiliary pole may be separated by a second gap layer comprised of a material that is less magnetically conducting than the first return pole and the second auxiliary pole. A portion of the second auxiliary return pole may be located between the first pole and the first return pole. A third pole may also be included.

The third pole may have multiple magnetic layers separated by multiple gap layers. The multiple magnetic layers may comprise a second return pole which produces a third hard axis field and a third auxiliary pole that produces a third auxiliary field that opposes the third hard axis field resulting in a reduced net hard axis field.

The second return pole and the third auxiliary pole may be separated by a third gap layer comprised of a material that is less magnetically conducting than the second return pole and the third auxiliary pole. A portion of the third auxiliary return pole may be located between the first pole and the second return pole.

Other features and advantages of the invention will become apparent from the following description, including the claims and drawings.

DESCRIPTION OF THE DRAWINGS

Like reference numerals in the figures indicate like elements.

DESCRIPTION

Figure 1A:
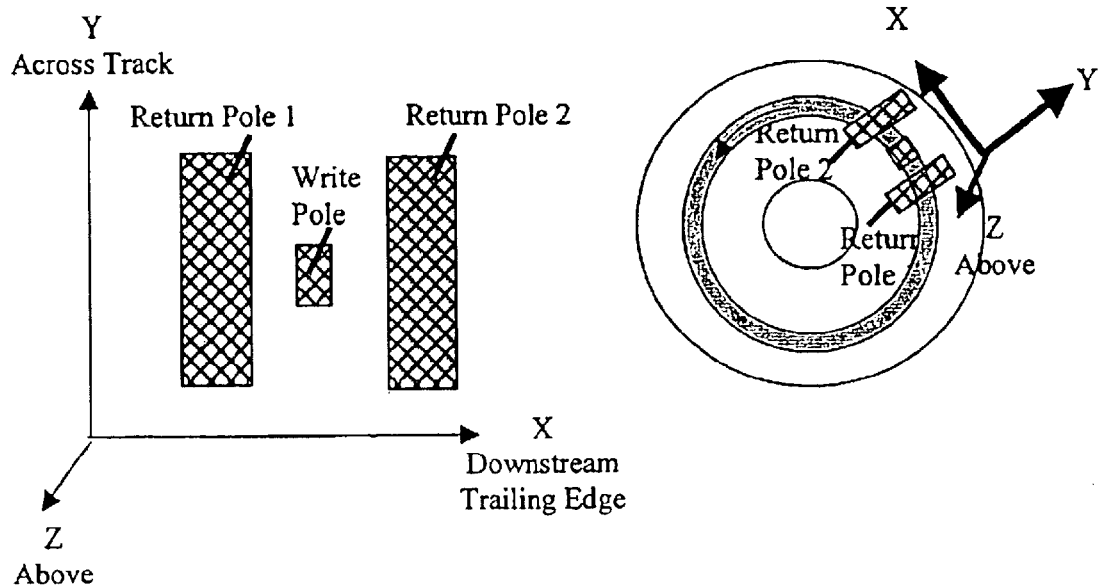
FIG. 1a shows a conventional write head and a magnetic disk in a disk drive.
Figure 1B:
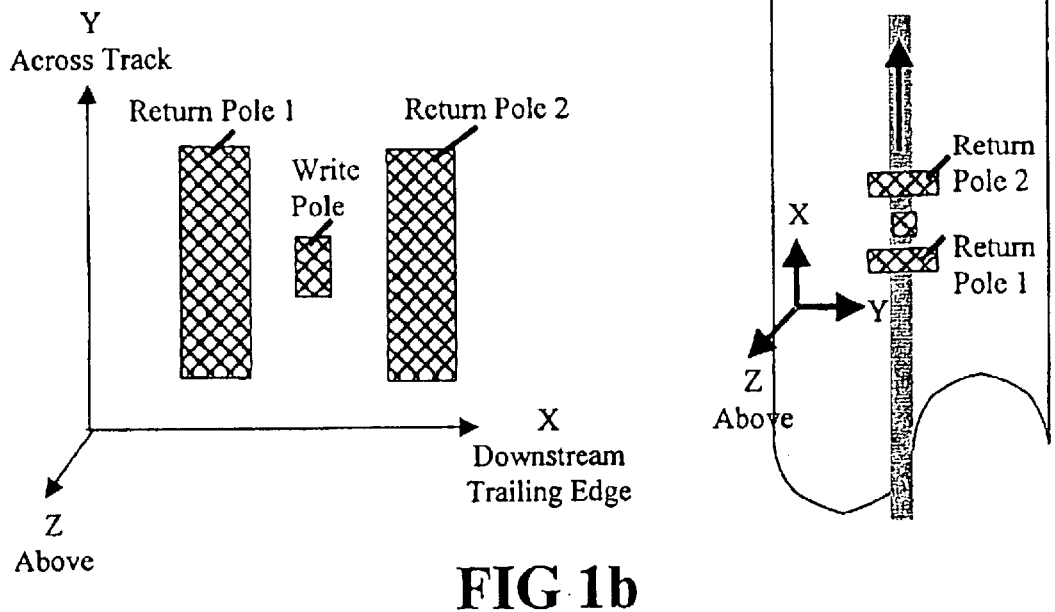
FIG. 1b shows a conventional write head and magnetic tape in a tape drive.
Figure 2A:
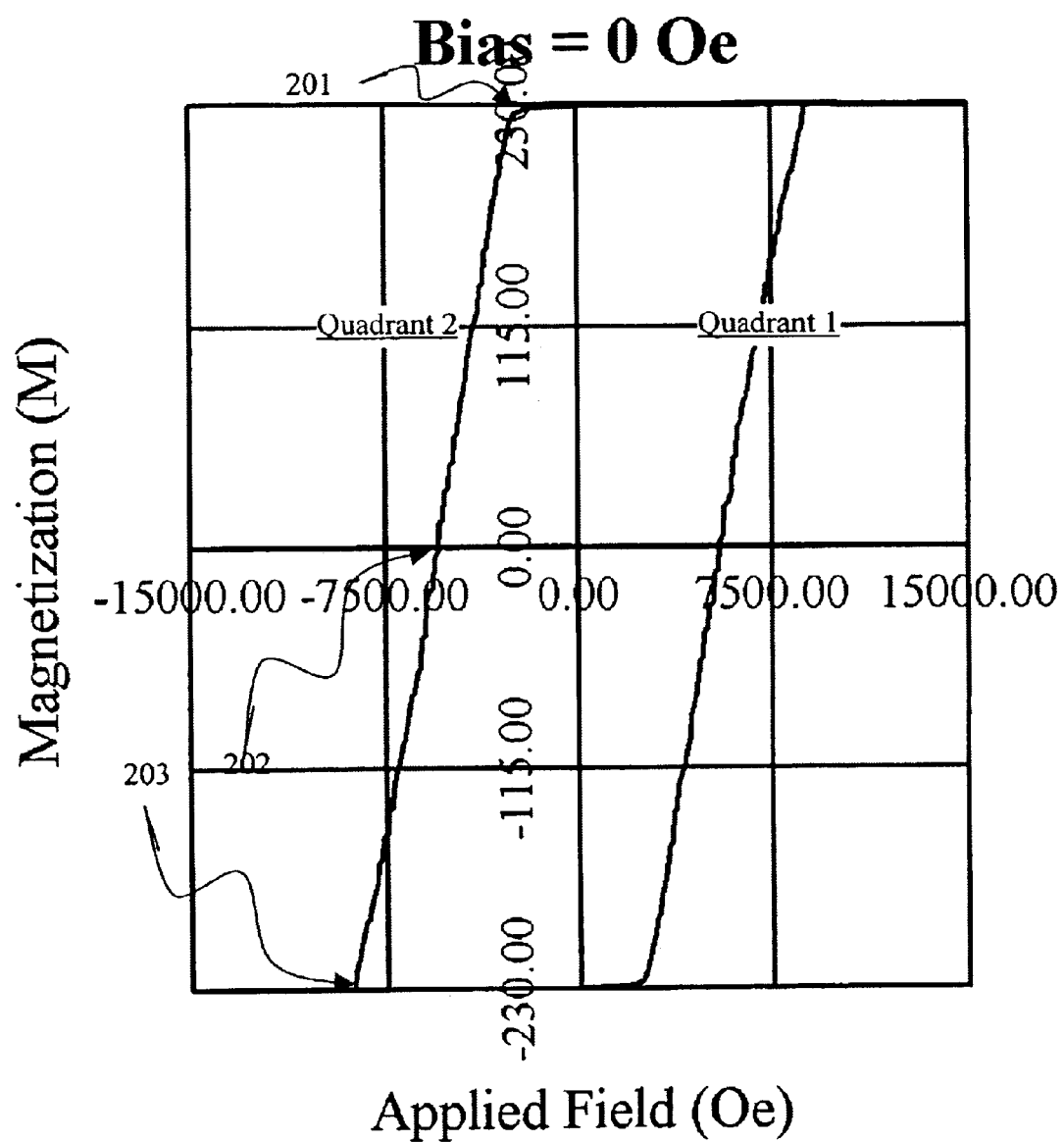
FIG. 2a is a graph showing a magnetic recording medium magnetization response to an easy axis field.

Referring to FIG. 2a, the graph shows the magnetic response in emu/cc of a perpendicular magnetic recording medium to easy axis fields ($H_{Easy}$) in the absence of hard axis fields ($H_{Hard}$). FIG. 2a shows a nucleation point 201 in the second quadrant of the graph at an effective negative nucleation field of 2500 Oe. The nucleation point is the point at which a first grain in the magnetic recording medium flips magnetization direction irreversibly. The nucleation point is also the point at which the curve shown in FIG. 2a begins a downward slope (not shown).

Figure 2B:
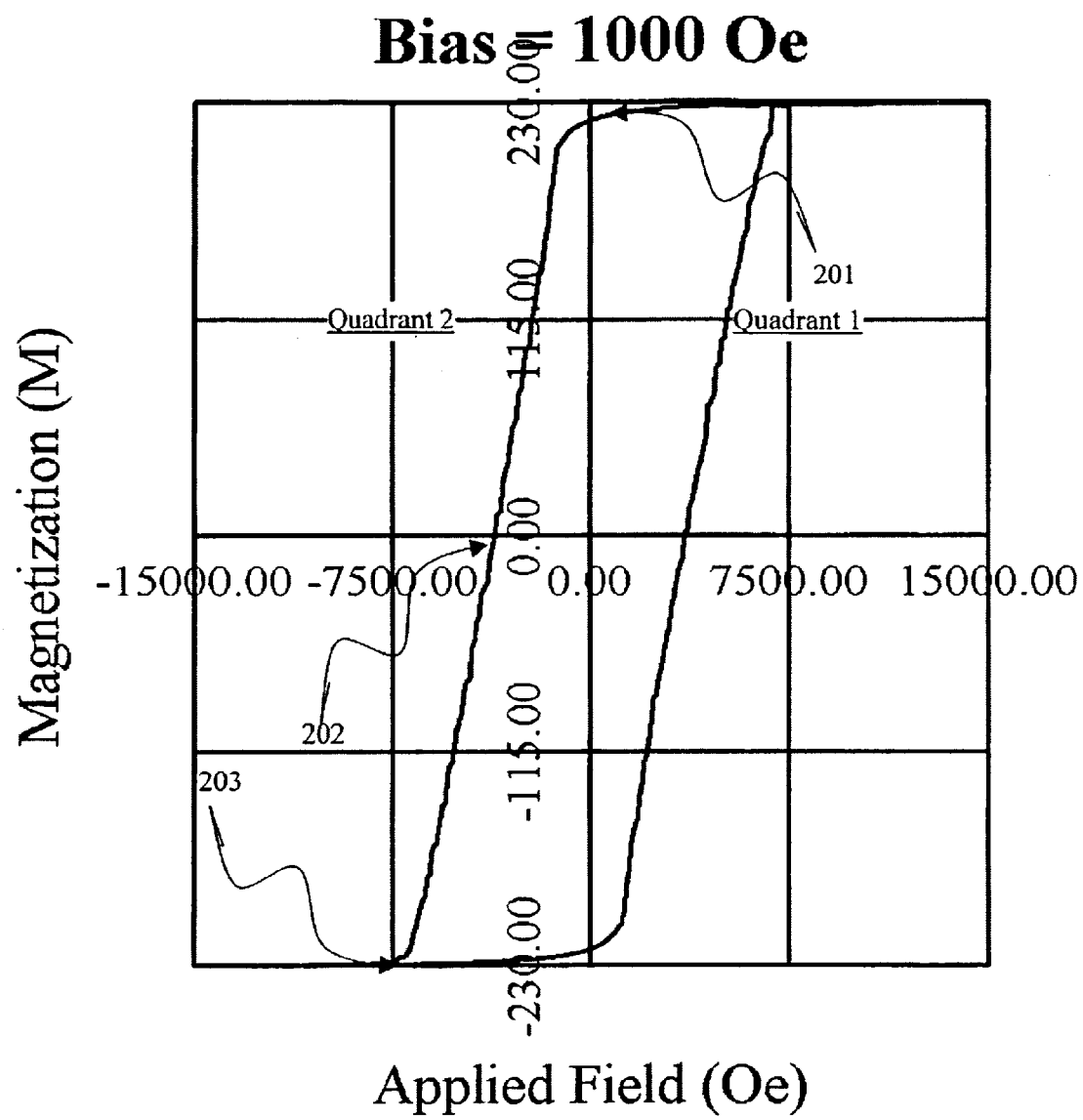
FIG. 2b is a graph showing the effect of the medium magnetization response to an easy axis field in the presence of a hard axis bias field of 1000 Oe.
Figure 2C:
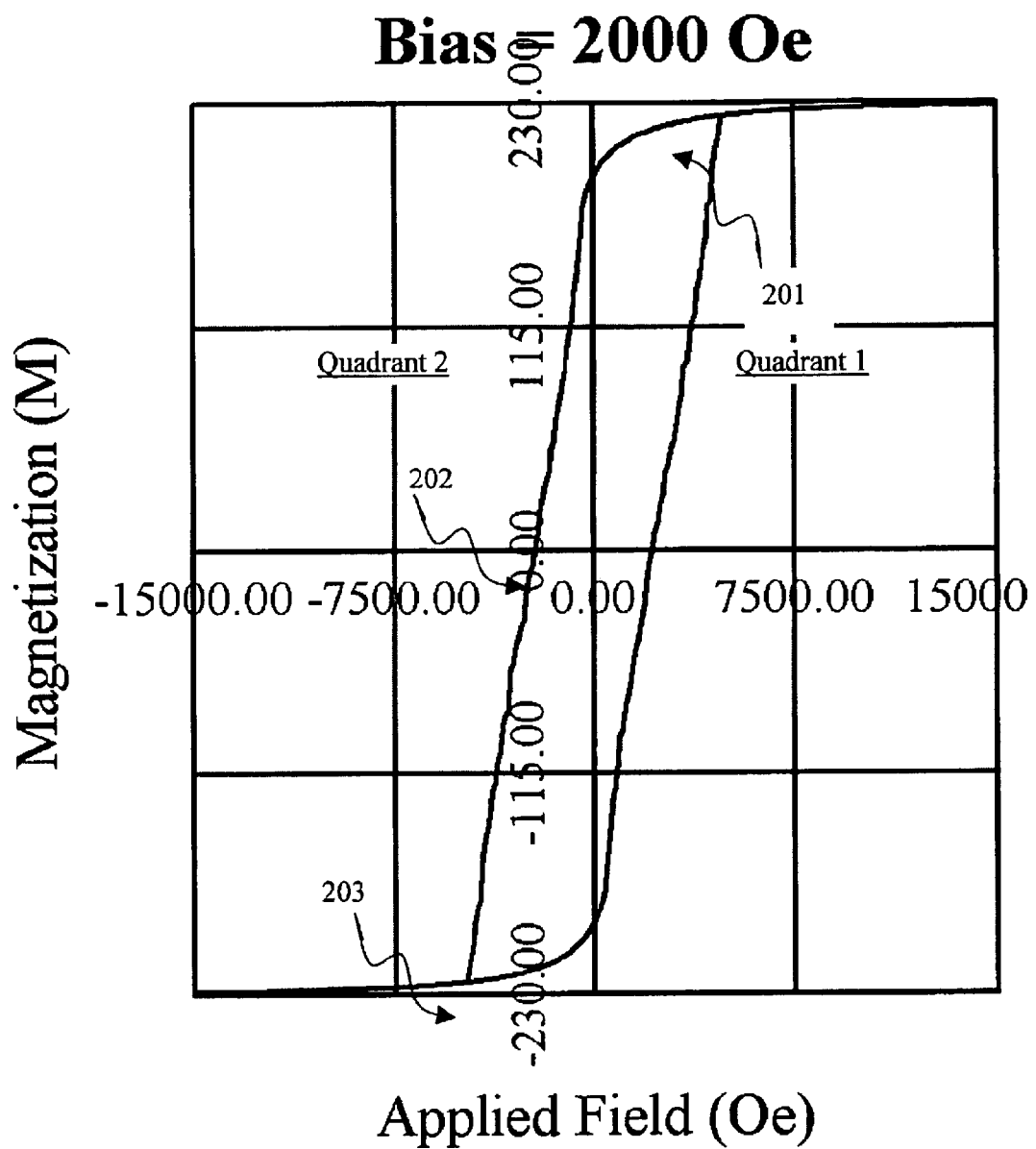
FIG. 2c is a graph showing the effect of the medium magnetization response to an easy axis field in the presence of a hard axis bias field of 2000 Oe.

As shown in FIG. 2a, in the absence of a hard axis field, 2500 Oe of applied field in the easy axis direction is needed to cause the first grains to flip their magnetization direction. FIG. 2b shows a response of the medium of FIG. 2a in the presence of a 1000 Oe hard axis bias field. FIG. 2c shows a response of the medium of FIG. 2a in the presence of a 2000 Oe hard axis bias field.

The presence of the hard axis bias fields in FIGS. 2b and 2c implies the use of vector fields for magnetization switching. The graphs of FIGS. 2b and 2c show that a hard axis bias field moves the nucleation point 201 to the first quadrant, which eliminates the need for an easy axis field to switch the initial grains. In this case, inherent demagnetization fields in the easy axis direction are sufficient to switch the first grains. The figures also show that the coercive field 202 required to switch half the grains in the material, and the field 203 required to switch all the grains in the material, are reduced with an increasing hard axis bias field. This is consistent with the expectation of lower write field requirements with vector fields or hard axis assist fields.

Figure 3:
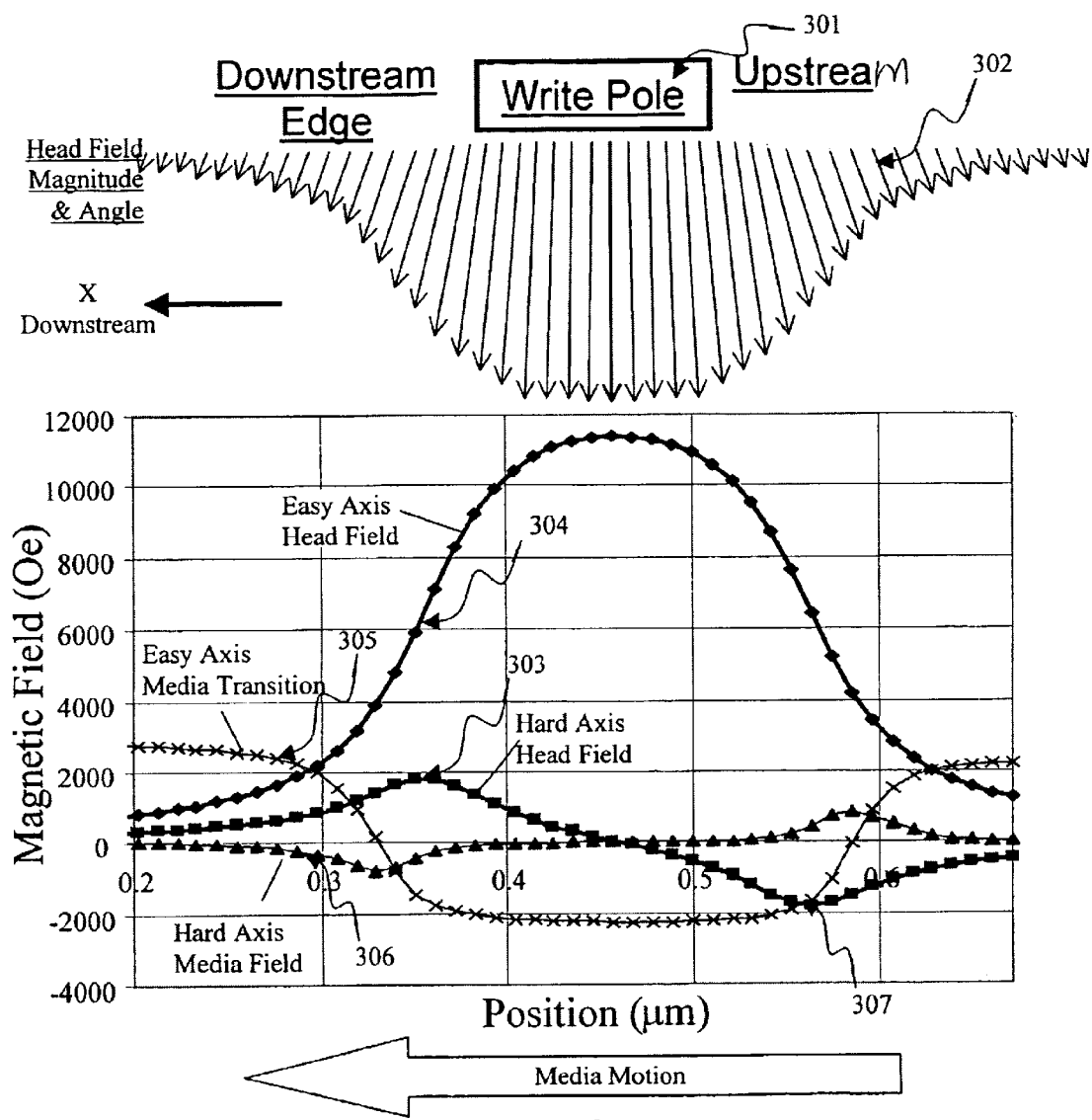
FIG. 3 is a graph showing head fields and resulting medium magnetization and fields at the center of a perpendicular magnetic recording medium with a soft underlayer.

The graph in FIG. 3 shows the fields in the head and the medium during the write process and from the written transition. In this example, the medium comprises a perpendicular hard layer with a soft magnetic underlayer. All values shown are relative to the center of the medium hard layer thickness. The write pole (also referred to as the "probe pole") is labeled 301 in FIG. 3. The fields, both magnitude and direction, emanating from the write pole at the center of the medium hard layer are labeled 302 (longer arrows in the figure indicate stronger magnetic fields). The upstream edge is of little consequence, since this region will be re-written as the media continues to move on. The downstream edge (often known as the "trailing edge") is of most interest, since this is the final transition that is being written.

In the downstream region of the write head, as the graph shows, the largest hard axis fields 303 in the head are created at the same location as the largest easy axis write field gradient 304. The graph also shows that the recording medium transition 305 begins forming with little easy axis field due to assisting hard axis fields from the head. The initial grains that switch in this low field are generally the smallest grains with the weakest anisotropy. However, as the transition starts forming, a medium induced hard axis field 306, which opposes the head induced hard axis field, reduces the total hard axis assist field. This makes switching the medium magnetization further more difficult, requiring greater write head easy axis fields.

Meanwhile, the medium continues to move under the head, which prevents complete switching of the grains in the vicinity of the initial grains that switched. This results in a wide transition with a poorly defined edge. This is because the beginning of transition formation is on an M-H loop with hard axis field bias, while the end of the transition is formed on the M-H loop with less hard axis field bias. Therefore, while it is true that the transition was written using less write field than the easy axis coercivity of the medium would indicate, the result is a poorly defined and wide transition.

This same detrimental effect occurs on track edges where the vector recording process is manifested as a wide written track width (compared to the physical track width of the pole) and a poorly defined edge. The track edge effect also degrades the side-writing and the erase band that may be needed for high track density. The edge of the track is not well defined and the boundaries between track, track edge, and erase band are not well defined, effectively adding cross-track noise to the transition. This also is manifested as a degradation of adjacent track data with multiple writes of the current track.

The hard axis field component at the return pole also results in reduction of the nucleation field and reversed grains in an already-written area under the return pole fringe field. The presence of the soft underlayer under the perpendicular layer of the recording medium functions to make the fields more perpendicular and, therefore, more along the easy axis. The problems described above would be worse in the absence of a soft underlayer and also in the case where the distance between the head and soft underlayer is increased. For thermal stability reasons, it is well known to increase the medium perpendicular layer thickness to increase grain volume, which implies an increase in the head to soft underlayer thickness.

The amount and location of the hard axis fields are determined by the extent of fringe fields from the write head, which is highly dependent on the spacing between the head and soft underlayer. The write head described herein aims to improve the write field gradient while reducing the hard axis field at the recording medium, rather than increasing the hard axis field. The write head provides a better written transition for any spacing between the head and the soft underlayer, thereby allowing an increase in this spacing, and thus medium thickness, resulting in greater thermal stability of the medium.

In order to overcome undesired switching of grains due to a reduced nucleation field downstream and off-track from the write pole and at the return pole, the write head described herein reduces the hard axis field at the medium, which was the cause of the reduced nucleation field. The hard axis fields are dependent on the basic physics of fields from the write head in the presence of the medium. Additional structures therefore are included on the write head to produce or shape the magnetic fields.

In one embodiment, the write head includes multiple poles. These multiple poles also create hard axis fields, but these hard axis fields are opposite in polarity or direction to the hard axis fields from the write pole and return pole. As a result, the write head counters effects of the reduced nucleation field due to the hard axis field. The additional poles may be situated in the areas of concern, such as in the downstream direction of the write pole, the track edges of the write pole, the downstream or upstream edges of the return pole (whichever is closer to the write pole), and/or the track edges of the return pole.

The write head improves the head field gradient by reducing the hard axis fields and forcing the transition to be made on a mostly easy axis M-H loop. This results in improvements in the quality of the written transition at the downstream edge of the head and the quality at the track edge(s) of the head. The write head described herein can also reduce incidences of reversed grains in the return pole and provide extendibility of design to accommodate greater head to soft underlayer spacing.

Referring to FIG. 3, the hard axis fields from the write head at the recording medium are of opposite polarity at the upstream edge 307 compared to the downstream edge 303. In one embodiment, a second pole structure, or "auxiliary" pole, is included on the write head. The auxiliary pole is constructed so that the auxiliary pole lies downstream of the write pole and so that upstream fields of the auxiliary pole overlap the downstream fields of the write pole. In this case, the hard axis fields at the medium from the auxiliary pole are opposite in polarity to hard axis fields from the write pole. Thus, the auxiliary pole provides "auxiliary" hard axis fields at the medium that reduce or cancel hard axis fields from the write pole, which are the source of the problems noted above.

Figure 4A:
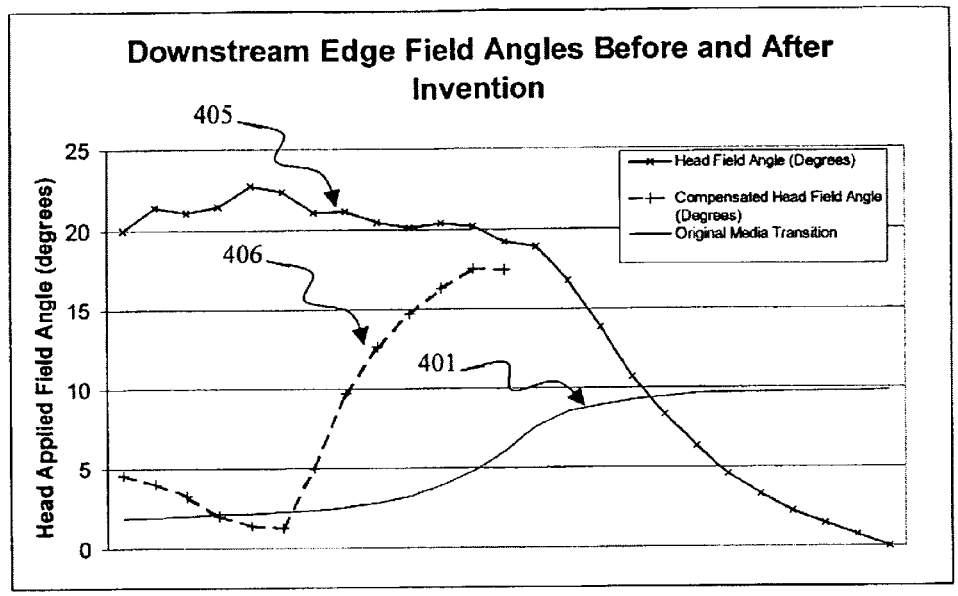
FIG. 4a is a graph showing modified head field angles from a write pole and auxiliary poles as compared to original values from the write pole alone.
Figure 4B:
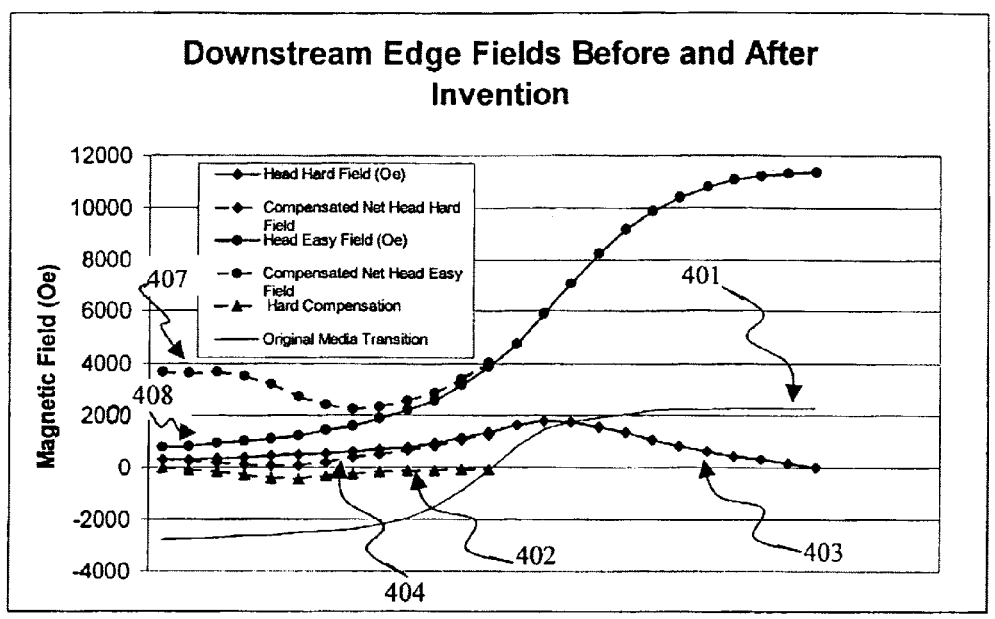
FIG. 4b is a graph showing the modified head fields from the write pole and auxiliary poles as compared to original values from the write pole alone.

FIG. 4b shows the effect of the auxiliary pole hard axis and easy axis fields at the medium for an auxiliary pole that produces 25% of the write pole fields (both easy and hard axis). In the case of FIG. 4b, the auxiliary pole is situated downstream of the write pole such that the hard axis fields from the auxiliary pole reduce the hard axis fields from the write pole to near zero where a transition would have originally started. The resultant easy and hard fields at the medium for the write pole with the auxiliary pole are shown in dashed lines. The original fields for the write pole only are shown in solid lines.

More specifically, reference numeral 401 shows the original transition in the medium and reference numeral 402 shows the new added hard axis fields from the auxiliary pole. The hard axis fields from the write pole only are shown as 403. When the total hard axis field is plotted as 404, it is evident that the hard axis field is near zero where the original transition would have started. Also, it can be seen from the head field angle graphs of FIG. 4a that the original write pole field angle 405 changes to 406 with the addition of the auxiliary pole fields to the write pole fields. This means that there are nearly perpendicular fields in the region that originally had fringe fields at about 20 degrees. This also means that the write head is functioning on the easy axis loop with large negative nucleation fields.

Figure 5A:
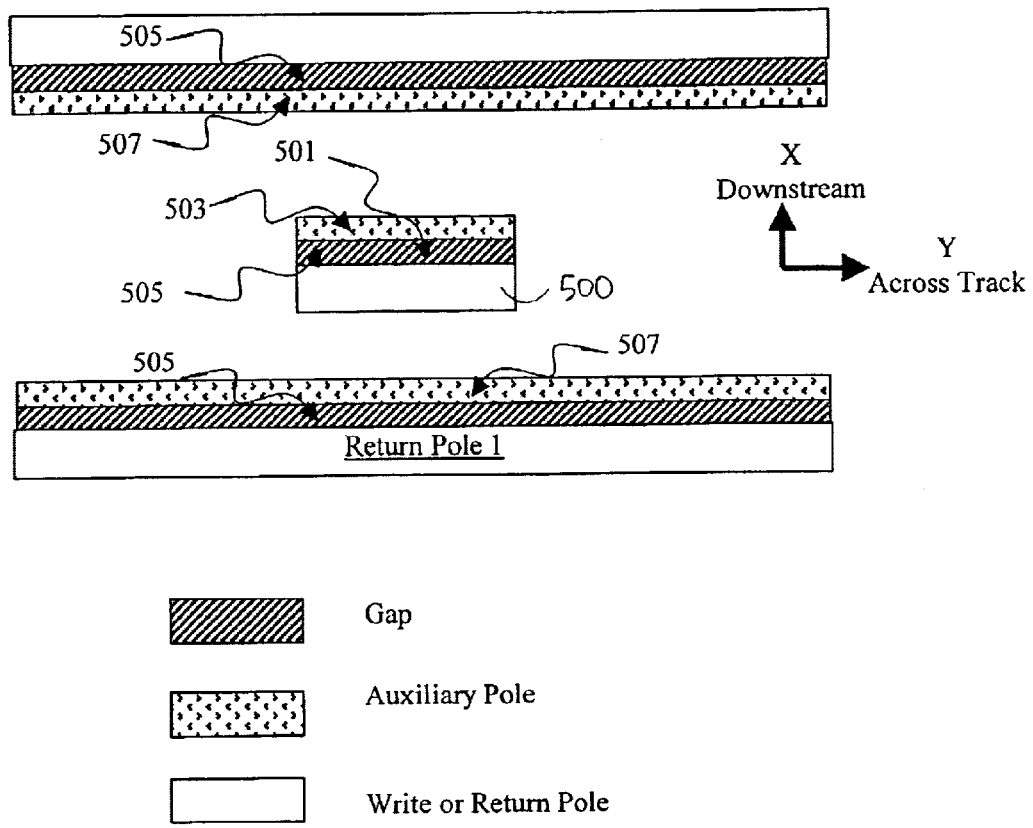
FIGS. 5a and 5b are side views of different embodiments of a write head according to the invention.
Figure 5B:
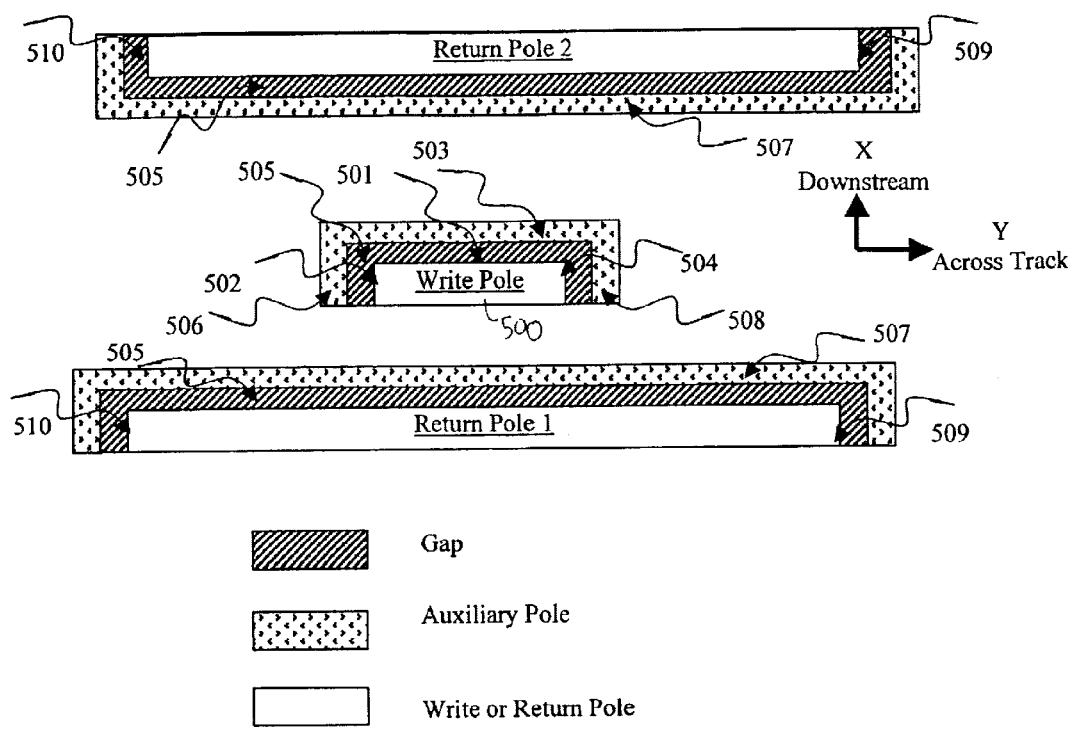
Figure 6A:
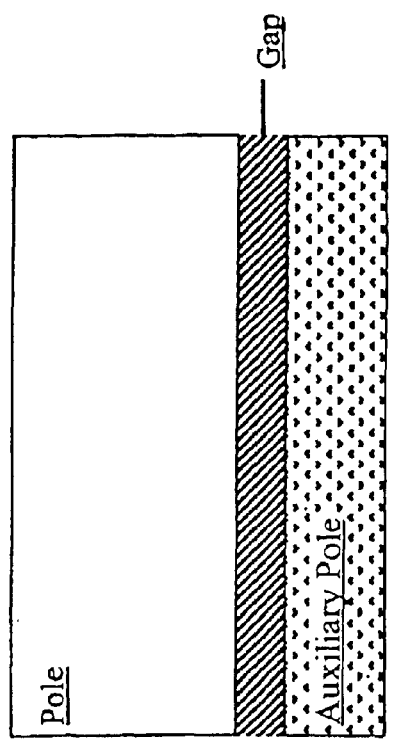
FIGS. 6a to 6d show cross-sectional views of a pole in the write head according to the invention.
Figure 6B:
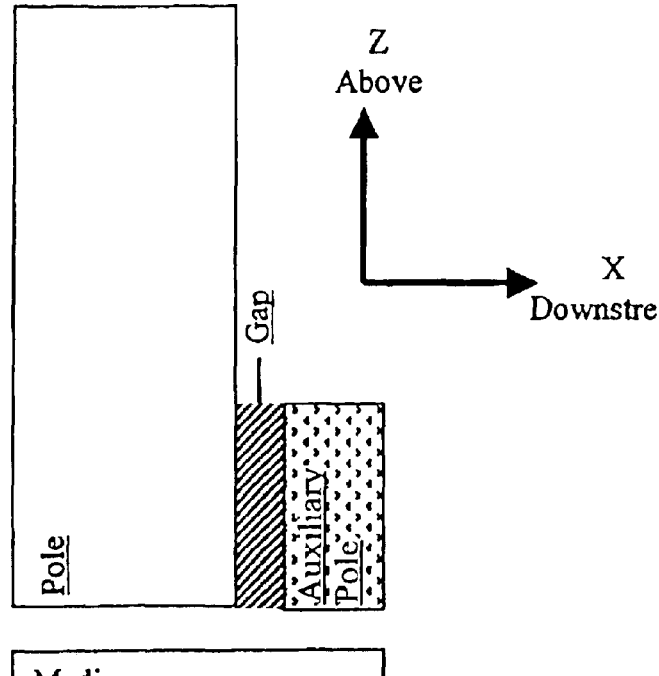
Figure 6C:
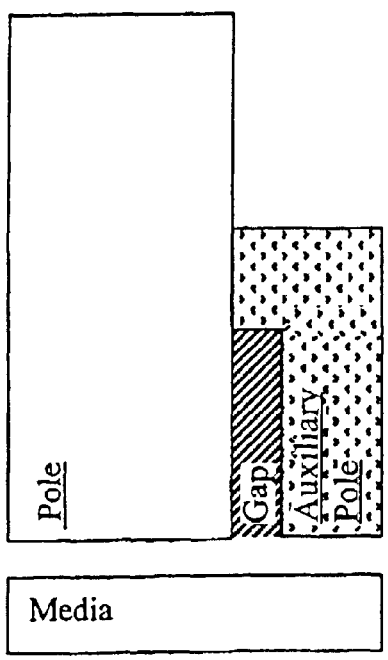
Figure 6D:
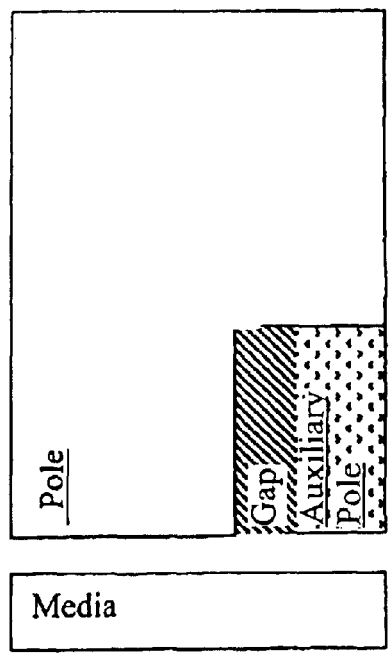

FIG. 5a shows one embodiment of the write head according to the invention. The write head has an auxiliary pole 503 to create hard axis fields that oppose hard axis fields created by the write pole 500, thereby effectively reducing the hard axis (or vector) field at the downstream edge 501 of the write pole. FIG. 5b shows another embodiment of the write head with improved downstream edge 501 and track edges 502 and 504 vector field characteristics. Only one of the track edge auxiliary poles 506 or 508 may be used or both may be used, in conjunction or separately from the downstream auxiliary pole 503. These auxiliary poles may be separate structures or integral parts of a single structure (shown).

The embodiments of FIGS. 5a and 5b include a magnetically insulating spacer layer (gap) 505 around the pole in the downstream edge and/or track edges, followed by poles of a lower saturation magnetization material 503, 506, 508 (auxiliary pole) relative to the main pole. Implementing this design on the write pole results in improved downstream edge transition shape and track edges.

The improvements resulting from the design of FIGS. 5a and 5b are due to a reduction of vector writing by forcing the write field to be substantially in the easy axis direction of the medium. This is achieved by using an auxiliary pole that is energized in the same direction and possibly by the same coils that energize the write pole. The fringe fields, which are the source of the hard axis or vector fields, can then be controlled since they are a function of both the write pole and the auxiliary pole.

In the write head of FIGS. 5a and 5b, each gap is large enough (e.g., more than half the head-to-medium spacing) so that the magnetic fields at the medium from two magnetic layers interact. As a result, the auxiliary pole in-plane or hard axis fields from the medium at least partially cancel the in-plane or hard axis fields at the medium from the primary pole.

The auxiliary layers shown in FIG. 5a and FIG. 5b need not extend too far behind the recording surface of the write head. While there is no disadvantage to allowing the layers to extend the full height of the head, there is no requirement for this either. In one embodiment, the auxiliary pole extends the full height of the head, while in another it extends less than five (5) microns behind the head recording surface (the head surface closest to the medium). However, at least some portion of the auxiliary layers is in the region between the head surface and five (5) microns behind the head recording surface.

FIGS. 6a to 6d show various configurations for the write pole and/or return pole(s) of the write head. In particular, FIGS. 6a to 6d show different configurations for the pole, the gap, and the auxiliary pole.

As shown in FIG. 5a and FIG. 5b, gap 505 and auxiliary pole 507 can be used in the return pole(s) to limit magnetization reversal on the return pole on the edge closest to the write pole and on the track edges of the return pole(s) 509 and 510. The downstream edge feature is used for both the write pole and the return pole and the track edge feature is used for the write pole in narrow track width applications. However, any combination of these features, including just one of the track edges and not both, could be used on any pole.

Implementation of the foregoing write head design in normal head processing may include depositing a gap and auxiliary pole immediately after patterning of pole layers, followed by patterning and etching of the same layers to remove the layers from the field regions. The deposition, patterning, and etching processes can be performed using standard head processing techniques, such as sputtering, plating, photolithography, wet chemical etching, ion milling, etc., or by any new or other techniques for performing deposition, patterning and etching.

Each gap (or magnetically insulating spacer layer) can be made from any non-magnetic material that is compatible with neighboring materials and processing requirements. Examples of such materials include, but are not limited to, oxides such as aluminum oxide, nitrides such as aluminum nitride, and metals such as chrome. The gap is insulating relative to neighboring pole materials so that the magnetic conduction of the gap is less than the pole. The gap is not required to have a permeability of one (magnetically insulating) and could be some less permeable magnetic material. The gap could be an air gap or a material gap that extends only slightly behind the surface of the write head, so long as the gap extends far enough back to create a hard axis correction field in the medium.

The auxiliary pole can be made of any magnetic material such as NiFe alloys. The material may be chosen for compatibility to neighboring materials and processing requirements and for its magnetic properties, such as saturation magnetization, magnetostriction, and anisotropy. The auxiliary pole may extend only slightly behind the surface of the write head, at which point the auxiliary pole may end, connect to its primary pole, or continue extending, as shown in FIGS. 6a to 6d.

It is desirable to have the auxiliary pole produce less field than the write pole (to prevent unwanted writing from the auxiliary pole). Therefore, the auxiliary pole may be designed to easily saturate. This can be achieved by manufacturing the auxiliary pole from the same or different material as the write pole and adjusting the geometry of the auxiliary pole to obtain the proper saturation and flux carrying capacity. In this context, adjusting the geometry refers to, but is not limited to, adjusting the thickness and/or width of the pole. This may include regional adjustment of the thickness by local milling/etching and/or regional adjustment of the width by mask design to control regions of saturation. The geometry and material properties of the auxiliary pole may be chosen to provide any desired amount of hard axis field cancellation and any desired easy axis field to prevent unwanted writing.

Figure 7:
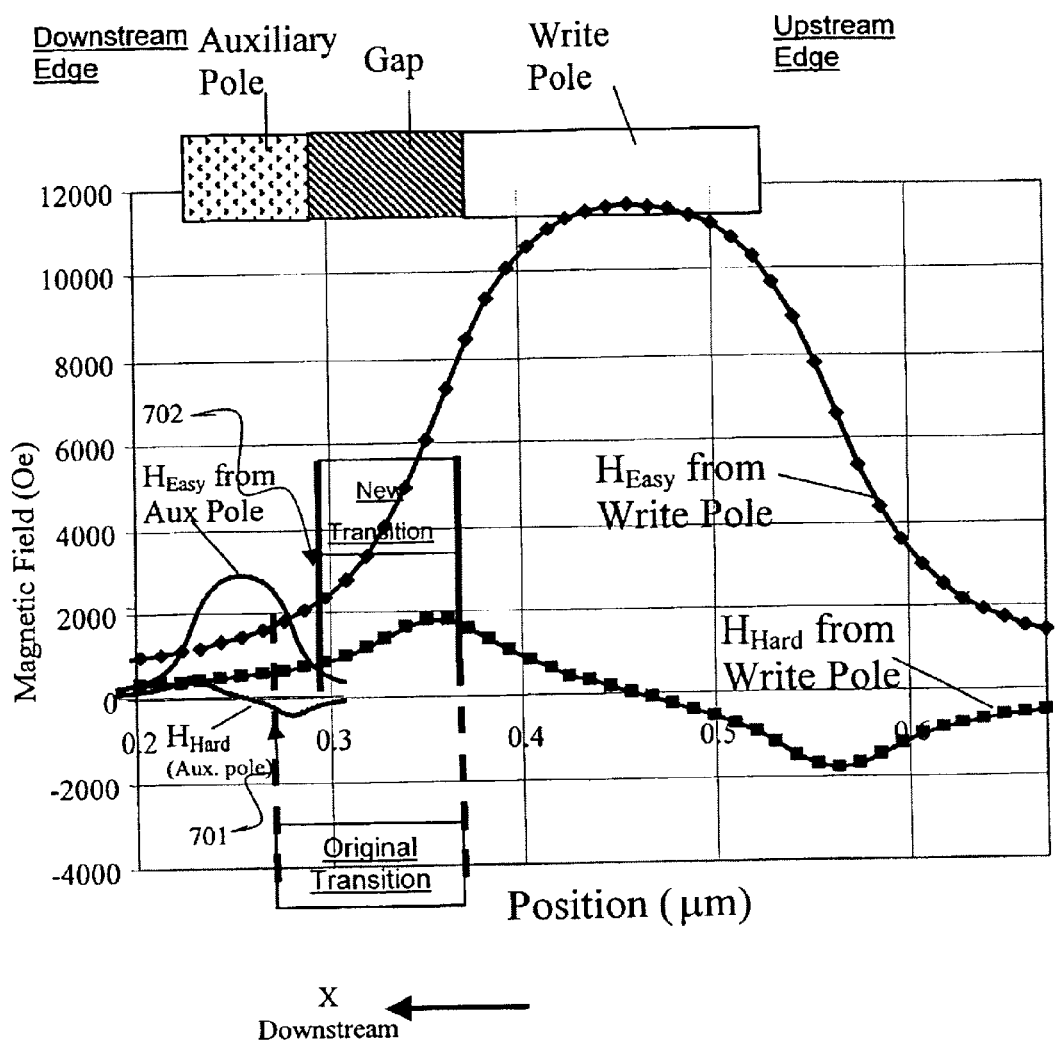
FIG. 7 is a graph showing the head fields for the write pole and auxiliary pole and improvements in the medium transition.

Referring to FIG. 7, the gap thickness, or the spacing between the write pole and the auxiliary pole, is chosen to force opposing hard axis fields 701 from the auxiliary pole to reduce or cancel hard axis fields from the write pole in regions where the original transition (without the auxiliary pole) would have begun forming. This forces the transition to begin forming closer to the physical location of the write pole and in a region of steeper easy axis field gradient 702. The same effect occurs at the track edges and on the return pole, as described above.

The extent and location of the hard axis fields from the write pole are substantially dependent on the spacing between the write head and the soft underlayer. This spacing is determined by design variables, such as head and medium overcoats, flying height, medium thickness and interlayer thickness. The gap thickness in the subject write head should be optimized vis-à-vis the spacing between the write head and the soft underlayer in order to effectively cancel the write pole hard axis field at the correct location(s).

It is advantageous to increase the head to soft underlayer spacing to maintain thermal stability of the medium without detrimentally affecting the transition. The subject write head permits this, since the gap thickness can be changed to place the "correction" (or canceling) hard axis fields from the auxiliary pole to prevent writing at the wider fringe field resulting from the increased spacing between the head and the soft underlayer. Changing the gap thickness also permits optimization of the appropriate ratio of hard axis fields (for faster and lower field switching) and easy axis fields (for sharper, less noisy transition and track edge control) as a function of position along the track and across-track.

The methodology to obtain the appropriate thickness and/or geometry for the gap and the auxiliary layer and the material choice for each layer can be optimized through available modeling techniques to provide the best combination of hard and easy axis fields for a particular application. The same methods used to design the write pole alone may be used to design the auxiliary pole structure for the write pole downstream edge, the write pole track edges, and the return poles. The key change is to sum the fields from the auxiliary pole structure with those from the write pole to determine the fields created by the combination. How the medium responds to the combination or sum of fields and media magnetization is determined by the response to the added field(s).

As noted, the head field angles with respect to track and off-track positions are a consideration in determining the quality of the media transition (width and noise). It should be noted that the reduction in head field angle due to the auxiliary pole structure will result in less torque and therefore longer switching times. This angle determines the amount of torque as well as the nucleation field and, therefore, the probability of medium grain magnetization switching within a given time. This is a consideration in determining the optimal head field angle for combined auxiliary pole and write pole fields. Therefore, there is a tradeoff between speed of switching and the quality of the transition (width and noise). Consequently, the optimal design for the auxiliary pole structure should consider the particular application. As noted, the placement and material properties and geometry of the auxiliary pole determine the fields from the auxiliary pole. Since this can vary, there can be any number of combinations of resultant angles of the net field (meaning fields from the auxiliary pole(s) combined with fields from the write pole) with respect to track and off-track position.

Care should be taken in choosing the amount of field created by the auxiliary pole material to ensure that writing does not commence in the downstream edge of the auxiliary pole where the hard axis fields again reduce the switching field requirements. The easy axis fields from the auxiliary pole in this region should be low enough to prevent magnetization reversal in the medium. The design alternatives shown in FIG. 5a and FIG. 5b help to assure this by creating a second gap 801 and a second auxiliary pole 802. The secondary auxiliary pole 802 creates even lower fields to oppose (e.g., cancel) the hard axis field components in the downstream edge of the primary auxiliary pole 800. As noted above, the primary auxiliary pole creates hard axis fields that oppose the hard axis fields created by the write pole or the return pole.

Figure 8A:
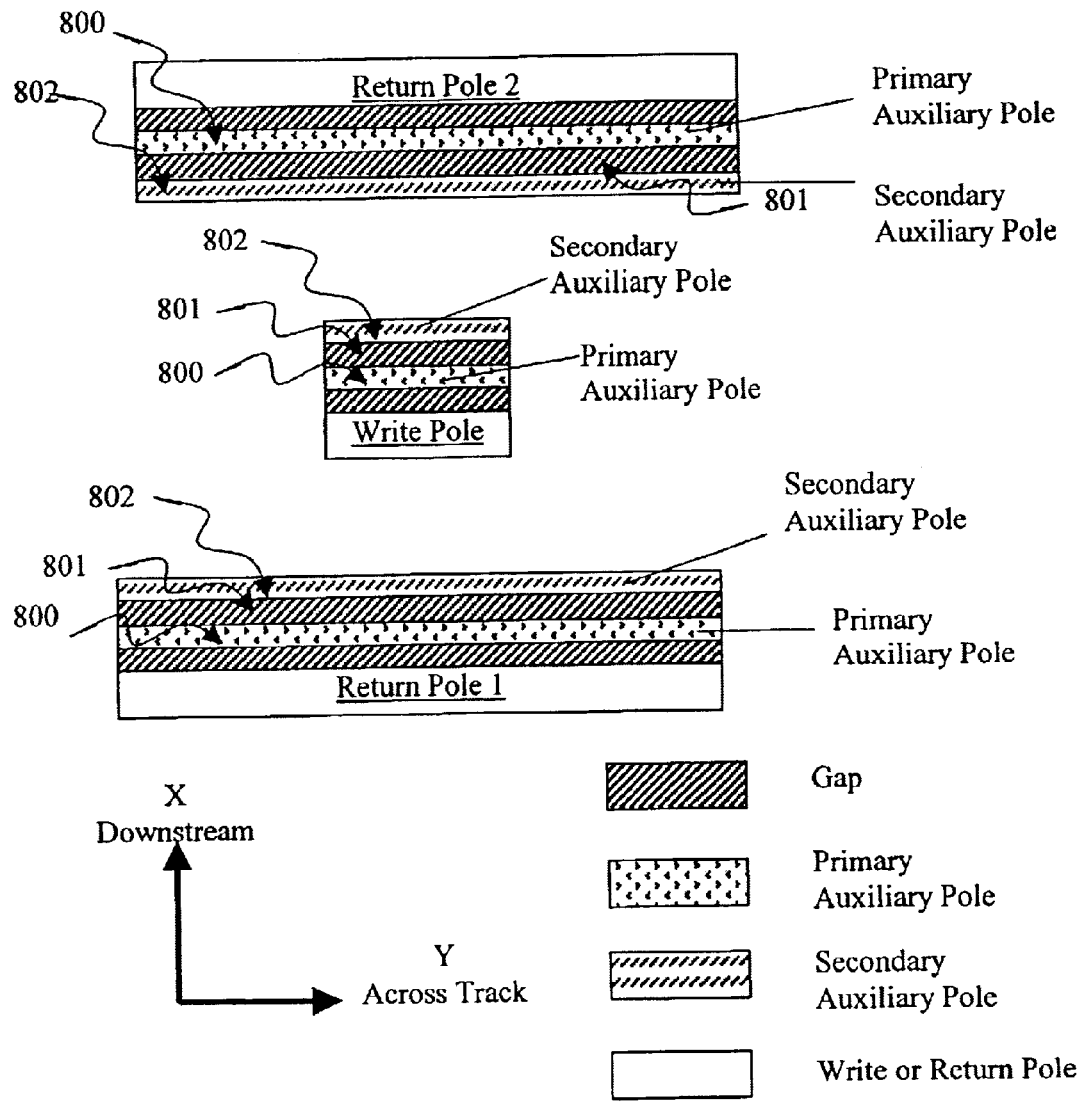
FIGS. 8a and 8b are side views of different embodiments of a write head according to the invention.
Figure 8B:
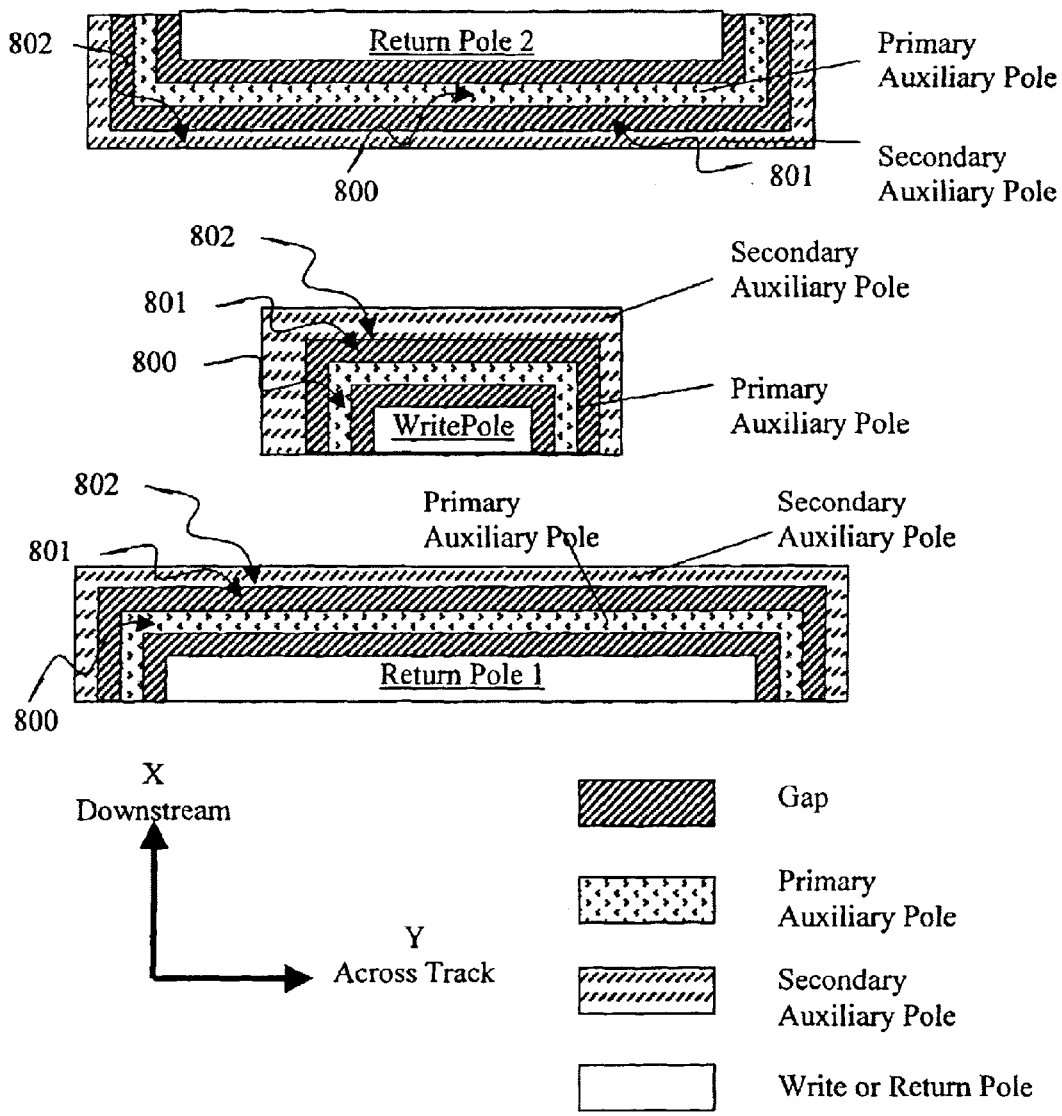

The multiple auxiliary poles of FIGS. 8a and 8b, with layers that create progressively lower magnetic field, can be used to prevent a transition from being written in a region of a low write field gradient, resulting in a narrower and less noisy transition. This is achieved by choosing materials of lower saturation magnetization or lower permeability, by changing the thickness of those layers, by changing the geometric shape of the layers, or by other means.

Although not shown in the drawings, one can continue adding additional gap and auxiliary pole layers (more than the two auxiliary pole layers shown in the figures) until the desired result is achieved. The design of these layers uses the same method as the design of the first auxiliary pole layer. In effect, both the easy and hard components of the net magnetic field at the medium are shaped to provide appropriate head field angles and head field magnitudes to prevent magnetization. This is done by using the essential shape of the easy and hard fields from the head, scaling them in both spread and magnitude, and superimposing the resulting fields to get the right combination for a desired application.

It may be slightly more costly to implement the additional layers shown in FIGS. 8a and 8b. But, all the depositions can be done in a sequence, then patterned a single time, and all the layers etched together to reduce processing complexity. It should also be noted that the gap may be only magnetically insulating. The gap may or may not be electrically insulating. This permits a wide choice of materials in the metal family that allow for easier processing compatibility for deposition and etching in conjunction with the pole layers. Further, use of the same material for the write pole and the auxiliary poles, and controlling field output by thickness and geometry, allows for the deposition of all layers in a two target deposition system (one for the magnetic material and the other for the gap), thereby further reducing the cost.

A magnetically similar approach is to create a single auxiliary pole, still separated by a gap to the associated write or return pole, which has a gradient (ramp) of properties in the down-track, and/or cross-track, direction. As an example, this single pole may have a lower saturation (or other property) adjacent to its associated pole (write pole or return pole) and the saturation may decrease as the distance to the pole in increased. Thus, no gap(s) would be required, although the material properties of the auxiliary pole may not be constant. This embodiment can be implemented by changing deposition variables (e.g. plating current, sputtering bias voltage, etc.) or by using different materials (e.g. separate targets for sputtering). This embodiment is a variation of the FIG. 5a, FIG. 5b embodiment, but is better understood after the rationale for embodiments shown in FIG. 8a, FIG. 8b.

Referring back to FIG. 4b, the resultant easy axis field 407 is significantly increased from the original easy axis field at the same point 408. This may be of concern since such a large easy axis field could switch grains even in the absence of hard axis fields. One way to create an auxiliary pole that enhances the hard axis fields at the expense of easy axis fields is to increase the magnetic spacing between the auxiliary pole and the soft underlayer. As noted, reducing the spacing between the pole and the soft underlayer makes the fields more vertical, or perpendicular, to the medium. Therefore, increasing the spacing between the head and the medium may be detrimental in the case of the write pole, since this would increase the amount of hard axis fields that are created, which are the source of the poor transitions. However, increasing the spacing between the auxiliary pole(s) and the soft underlayer, without increasing the spacing between the write pole and the soft underlayer, would increase the hard axis correction field from the auxiliary pole(s) and reduce the easy axis field therefrom.

Figure 9A:
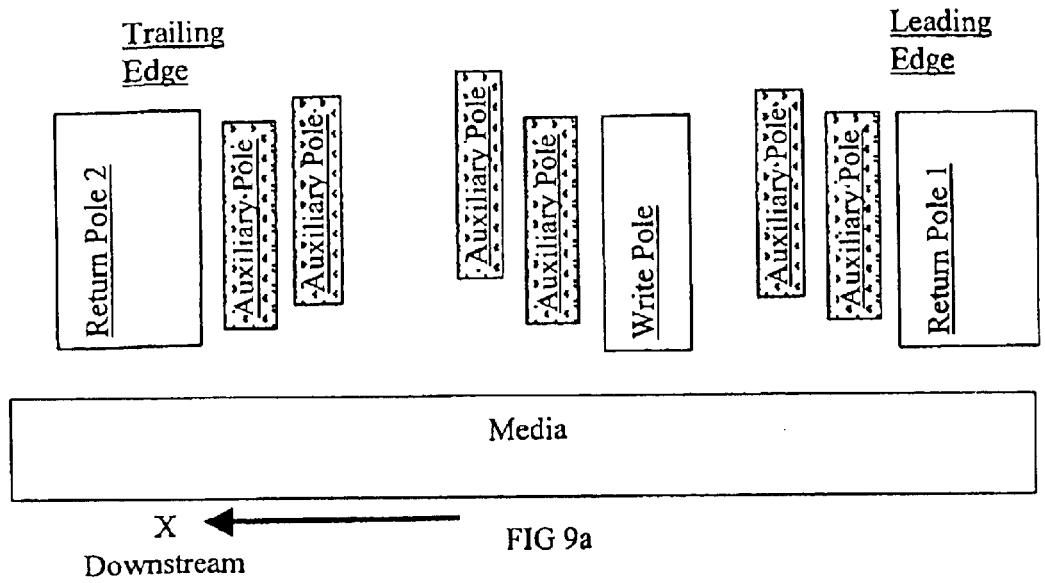
FIG. 9a is cross-sectional view, in the downstream direction, of a write head according to the invention with varying head-to-medium spacing.
Figure 9B:
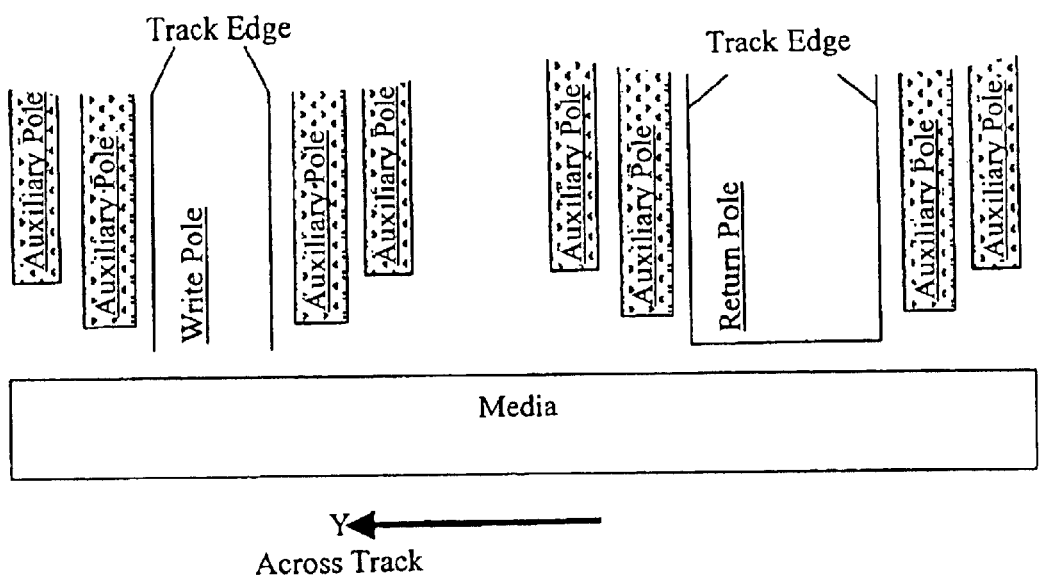
FIG. 9b is cross-sectional view, in the cross-track direction, of a write head according to the invention with varying head-to-medium spacing.

Reducing the auxiliary pole easy axis field to prevent medium magnetization reversal from the auxiliary pole easy axis field requires increasing the magnetic spacing between the head and the recording medium in the region of the auxiliary pole relative to the magnetic spacing between the head and the recording medium at the write pole. This is shown in FIG. 9a and FIG. 9b. This configuration increases the auxiliary pole hard axis field and reduces the easy axis field. This can be achieved either by an increase in the physical spacing between the write head and the medium or by forcing saturation at a controlled point behind the write head surface. Both methods result in changing the magnetic spacing between the head and the medium.

Changing the magnetic spacing between the head and the medium can be implemented in conjunction with, or in lieu of, the above-described method of using different saturation magnetization material and/or different thickness for the auxiliary pole. Changing the magnetic spacing between the head and the medium adds another degree of freedom in creating a desired combination of hard and easy axis fields at various points along the medium track. Thus, the write head design may depend on the magnetic spacing between the head and the medium for each pole and auxiliary pole layer in combination with the thickness, geometry and material properties of the pole, auxiliary pole, and gap layers. These factors should be considered to provide the appropriate combination of hard and easy axis fields desired at each location along the track and in the off-track direction of the medium. For example, for a given magnetic spacing between the head and the medium and for given material properties, the optimum thickness of the gap and the pole would be different than for a different magnetic spacing between the head and the medium and the same material properties. For a large enough magnetic-head-to-medium spacing, it is conceivable that the optimal gap thickness could be zero.

The physical head-to-medium spacing change (to create a change in magnetic spacing) can be implemented in a slider fabrication process through patterning and etching of a region with auxiliary pole(s). Alternatively, the physical head-to-medium spacing change can be implemented via lapping or etching processes that have different material selectivity in cases where a different material is used for the auxiliary poles and the main pole.

Increasing the physical head-to-medium spacing of the auxiliary pole region is particularly advantageous for planar head designs. Another way to achieve the same result is to change the magnetic spacing without changing the physical spacing. This may be done by using the embodiments described in FIGS. 5a, 5b and FIGS. 8a, 8b, and using geometrical design parameters to adjust the thickness and shape of the auxiliary pole and varying the material choices to create saturation at pole tip regions. This can be used to effectively increase the head-to-medium spacing of the auxiliary pole versus that of the primary pole, since the saturated region of the auxiliary pole at the head surface acts like a non-magnetic spacing.

Depending on the method used to change the magnetic head-to-medium spacing for the auxiliary pole as compared to its associated poles (write pole or return pole), this modification can be applied to any combination of the downstream edge and the track edges, write pole and return pole. Depending on the method used, the spacing may not be uniform across the surface of the auxiliary pole(s). From a processing standpoint, it may be easier to implement a gradual tapering of spacing away from the write pole, or some combination of tapering and steps. In any case, step spacing change, tapered spacing change, or some combination thereof, have the effect of increasing the hard axis fields at the expense of easy axis fields from the auxiliary pole.

Similar to graded material properties of the auxiliary pole, one could taper the head-to-medium spacing to create a non-uniform head-to-medium spacing as the distance to an associated pole is increased. In this case, gaps between the auxiliary layers can again be reduced or eliminated. These gradient pole versions (both graded material properties and tapered head-to-medium spacing) constitute a manifestation of the original single auxiliary pole design, with non-uniform material properties and/or non-uniform head-to-medium spacing.

It is noted that while FIGS. 9a and 9b depict the auxiliary layers at increasing physical, and thus magnetic, spacing to the medium (as compared to the write pole and any previous auxiliary layers), it is not a requirement that each auxiliary layer be at a different and increasing physical or magnetic spacing. While it may be desirable to increase the magnetic spacing of the auxiliary layers further away from the pole, structures will work even if the magnetic spacing of the auxiliary layers remain the same as the pole or even if they decrease compared to the pole. Therefore, the subject write head may incorporate all combinations of magnetic spacings of the auxiliary layers compared to each other and to the primary pole.

At least some portion of the one or more auxiliary poles associated with the write pole may be within a predetermined spacing of the surface of the write pole closest to the medium. For example, the auxiliary pole may be within 5 microns of the surface. Similarly, at least some portion of the one or more auxiliary poles associated with the return pole may be within 5 microns of the surface of the return pole closest to the medium. This is true regardless of whether the head-to-medium magnetic spacing is affected by physical changes.

The write head described herein improves transitions at the downstream edge of the pole and the definition of track edges in the written medium by reducing the hard axis fields at the medium. In addition to making transitions narrower and less noisy, the transitions also more closely follows the physical shape of the write pole with less curvature, which is an important characteristic for increasing track density and therefore areal density.

The auxiliary poles described herein, when implemented on the return pole, reduce the reversed grains from the return pole field, which is a desirable effect for effective recording. By adding layers of magnetic and less magnetic materials, and controlling the thickness, material properties, shapes, and head-to-medium spacing of these layers, resultant field profile (hard and easy axis field magnitudes) at the medium in the downstream and cross-track direction of the pole and the field in the vicinity of the return poles can be controlled. Since all of these properties (thickness, material properties, shapes, and head-to-medium spacing of these layers) influence the medium's field profile, there can be any number combinations to provide suitable performance for any given application. For any application, there may be a tradeoff point between switching time and quality (width and noise) of the transitions (down-track, track edge, and return pole (s)). This affects the field angles and magnitudes desired for the formation of the same transitions.

Other embodiments not described herein are within the scope of the following claims. For example, the write head has been described in the context of perpendicular recording; however, it can also be used with other recording systems, such as longitudinal recording systems. The write head can be incorporated onto a single read/write head, or used on its own, in any type of magnetic recording system including, but not limited to magnetic tape recording systems and magnetic disk drives.

What is claimed is:

1. A magnetic recording head comprising:
   a first pole which generates an easy axis field and an initial hard axis field relative to a recording medium; and
   a first auxiliary pole which generates a first auxiliary hard axis field that opposes the initial hard axis field.

2. The magnetic recording head of claim 1, further comprising a gap between the first pole and the first auxiliary pole, the gap comprising a less magnetically conducting material than the first pole and the first auxiliary pole.

3. The magnetic recording head of claim 1, further comprising:
   a second pole having an associated hard axis field relative to the recording medium; and
   a second auxiliary pole which generates a second auxiliary hard axis field that opposes the associated hard axis field.

4. The magnetic recording head of claim 3, wherein:
   the first pole and the first auxiliary pole comprise a write pole; and
   the second pole and the second auxiliary pole comprise a return pole.

5. The magnetic recording head of claim 3, further comprising a gap between the second pole and the second auxiliary pole, the gap comprising a less magnetically conducting material than the second pole and the second auxiliary pole.

6. The magnetic recording head of claim 1, further comprising:
   a second auxiliary pole which generates a second auxiliary hard axis field that opposes a magnetic field from the first auxiliary pole, the first pole, the first auxiliary pole, and the second auxiliary pole comprising a write pole.

7. The magnetic recording head of claim 6, further comprising:
   a first gap which separates the first pole and the first auxiliary pole, the first gap comprising a less magnetically conducting material than the first pole and the first auxiliary pole.

8. The magnetic recording head of claim 7, further comprising:
   a second gap which separates the first auxiliary pole and the second auxiliary pole, the second gap comprising a less magnetically conducting material than the first auxiliary pole and the second auxiliary pole.

9. The magnetic recording head of claim 1, wherein some portion of the first auxiliary pole exists in a region between a surface of the recording medium and a predetermined distance from the surface of the recording medium.

10. The magnetic recording head of claim 9, wherein the predetermined distance comprises five microns or less.

11. The magnetic recording head of claim 1, wherein the first auxiliary pole is a predetermined distance adjacent to the first pole.

12. The magnetic recording head of claim 11, wherein the predetermined distance comprises less than four times a distance between a write surface of the magnetic recording head and a center of the recording medium.

13. The magnetic recording head of claim 1, wherein the first auxiliary pole is located in a downstream direction relative to the first pole.

14. The magnetic recording head of claim 1, wherein the first auxiliary pole is located in one or more track edge directions relative to the first pole.

15. The magnetic recording head of claim 1, wherein the initial hard axis field is greater in magnitude than the first auxiliary hard axis field.

16. The magnetic recording head of claim 1, wherein the first auxiliary hard axis field combines with the initial hard axis field to reduce a net hard axis field at a point on the recording medium.

17. The magnetic recording head of claim 1, further comprising:
N (N>1) auxiliary poles which generate N auxiliary hard axis fields, the first pole, the first auxiliary pole, and the N auxiliary poles comprising a write pole.

18. The magnetic recording head of claim 17, further comprising gaps between layers of the N auxiliary poles.

19. A magnetic recording system comprising:
a magnetic recording medium; and
a magnetic recording head, wherein the magnetic recording head comprises:
  a first pole which generates an easy axis field and an initial hard axis field relative to a recording medium; and
  a first auxiliary pole which generates a first auxiliary hard axis field that opposes the initial hard axis field.

20. The magnetic recording system of claim 19, wherein the magnetic recording medium comprises one of a magnetic disk and a magnetic tape.

21. The magnetic recording system of claim 19, wherein the easy axis field is perpendicular to a surface of the magnetic recording medium.

22. The magnetic recording system of claim 19, further comprising a gap between the first pole and the first auxiliary pole, the gap comprising a less magnetically conducting material than the first pole and the first auxiliary pole.

23. The magnetic recording system of claim 19, further comprising:
N (N≧1) auxiliary poles which generate N auxiliary hard axis fields, the first pole, the first auxiliary pole, and the N auxiliary poles comprising a write pole.

24. The magnetic recording system of claim 23, wherein the first auxiliary pole and at least one of the N auxiliary poles are at different distances from the recording medium.

25. The magnetic recording system of claim 23, wherein the first pole, the first auxiliary pole and the N auxiliary poles are separated by gaps, the gaps comprising a less magnetically conducting material than the first pole, the first auxiliary pole, and the N auxiliary poles.

26. The magnetic recording system of claim 23, wherein the first pole, the first auxiliary pole and the N auxiliary poles are separated by gaps.

27. The magnetic recording system of claim 26, wherein one of the materials comprises air.

28. The magnetic recording system of claim 18, wherein the first pole comprises a write pole and wherein the magnetic recording system further comprises:
one or more return poles, at least one of the return poles comprising:
  a second pole having an associated hard axis field relative to the recording medium; and
  a second auxiliary pole which generates a second auxiliary hard axis field that opposes the associated hard axis field.

29. A magnetic recording head, comprising:
multiple magnetic layers, a first of the multiple magnetic layers producing an initial magnetic field and others of the multiple magnetic layers producing progressively smaller magnetic fields, the magnetic fields produced by the multiple magnetic layers acting to reduce a net hard axis magnetic field at a portion of a magnetic recording medium.

30. The magnetic recording head of claim 29, further comprising multiple gap layers which separate the multiple magnetic layers, the multiple gap layers comprising a material having less magnetic conductivity than at least one of the multiple magnetic layers.

31. The magnetic recording head of claim 29, further comprising:
a second set of multiple magnetic layers, a first of the second set of multiple magnetic layers producing an initial magnetic field and others of the multiple magnetic layers producing progressively smaller magnetic fields, the magnetic fields produced by the second set of multiple magnetic layers acting to reduce a net hard axis magnetic field at a portion of a magnetic recording medium.

32. The magnetic recording head of claim 31, wherein the second set of multiple magnetic layers comprises a return pole.

33. The magnetic recording head of claim 29, wherein the first of the multiple magnetic layers is located upstream relative to others of the multiple magnetic layers.

34. The magnetic recording head of claim 29, wherein the first of the multiple magnetic layers is located adjacent to a track edge relative to others of the multiple magnetic layers.

35. A magnetic recording head comprising:
means for producing an easy axis field and a hard axis field relative to a magnetic recording medium; and
means for reducing the hard axis field.

36. The magnetic recording head of claim 35, wherein the means for producing an easy axis field and a hard axis field comprises a write pole.

37. The magnetic recording head of claim 36, wherein the means for reducing the hard axis fields comprises at least one auxiliary pole.

38. The magnetic recording head of claim 37, wherein the auxiliary pole produces a magnetic field that acts to reduce the hard axis field.

39. The magnetic recording head of claim 38, wherein the magnetic field produced by the auxiliary pole is substantially opposite in polarity to the hard axis field.

40. The magnetic recording head of claim 38, wherein the magnetic field produced by the auxiliary pole substantially cancels the hard axis field at a point on the recording medium.

41. The magnetic recording head of claim 35, further comprising:
means for magnetically isolating the means for producing from the means for reducing.

42. The magnetic recording head of claim 41, wherein the means for magnetically isolating comprises at least one gap layer.

43. A magnetic recording head comprising:
a first pole having multiple magnetic layers separated by multiple gap layers, the multiple magnetic layers comprising a write pole which produces a first hard axis field and a first auxiliary pole that produces a first auxiliary field that opposes the first hard axis field resulting in a reduced net hard axis field, the write pole and the first auxiliary pole being separated by a first gap layer comprised of a material that is less magnetically conducting than the write pole and the first auxiliary pole, the write pole being located upstream from the first auxiliary pole relative to a perpendicular magnetic recording medium, a portion of the first auxiliary pole existing in a region between a surface of the perpendicular magnetic recording medium and five microns from a surface of the perpendicular magnetic recording medium.

44. The magnetic recording head of claim 43, further comprising:

a second pole having multiple magnetic layers separated by multiple gap layers, the multiple magnetic layers comprising a first return pole which produces a second hard axis field and a second auxiliary pole that produces a second auxiliary field that opposes the second hard axis field resulting in a reduced net hard axis field, the first return pole and the second auxiliary pole being separated by a second gap layer comprised of a material that is less magnetically conducting than the first return pole and the second auxiliary pole, a portion of the second auxiliary return pole being located between the first pole and the first return pole.

45. The magnetic recording head of claim 44, further comprising:

a third pole having multiple magnetic layers separated by multiple gap layers, the multiple magnetic layers comprising a second return pole which produces a third hard axis field and a third auxiliary pole that produces a third auxiliary field that opposes the third hard axis field resulting in a reduced net hard axis field, the second return pole and the third auxiliary pole being separated by a third gap layer comprised of a material that is less magnetically conducting than the second return pole and the third auxiliary pole, a portion of the third auxiliary return pole being located between the first pole and the second return pole.

46. The magnetic recording head of claim 1, wherein the first auxiliary pole has a gradient of properties in a down-track or a cross-track direction.

* * * * *